(12) United States Patent
Huang

(10) Patent No.: US 7,952,290 B2
(45) Date of Patent: May 31, 2011

(54) CURRENT-REGULATED LIGHT EMITTING DEVICE FOR VEHICLE USE

(75) Inventor: Kuo-Shien Huang, Tainan (TW)

(73) Assignee: Quan Mei Technology Co., Ltd., Yongkang, Tainan County (TW)

( * ) Notice: Subject to any disclaimer, the term of this patent is extended or adjusted under 35 U.S.C. 154(b) by 413 days.

(21) Appl. No.: 12/248,812

(22) Filed: Oct. 9, 2008

(65) Prior Publication Data

US 2010/0090614 A1 Apr. 15, 2010

(51) Int. Cl.
*H05B 37/00* (2006.01)
(52) U.S. Cl. .............................. 315/77; 315/80; 315/307
(58) Field of Classification Search .................... 315/82, 315/83, 76, 77, 80, 224, 307, 225
See application file for complete search history.

(56) References Cited

U.S. PATENT DOCUMENTS

| 6,653,789 B2* | 11/2003 | Roller et al. .................... 315/80 |
| 6,949,892 B2* | 9/2005 | Horiuchi et al. ............... 315/308 |
| 7,345,433 B2* | 3/2008 | Bacon et al. ................... 315/291 |

* cited by examiner

*Primary Examiner* — David Hung Vu
(74) *Attorney, Agent, or Firm* — Sheppard, Mullin, Richter & Hampton LLP

(57) ABSTRACT

A current-regulated light emitting device for vehicle use includes a light emitting unit and a current limiting unit. The current limiting unit includes first and second switches and first and second bias units. The first switch is for making and breaking an electrical circuit between the light emitting unit and an electric power source. The first bias unit is for causing the first switch to conduct so as to activate the light emitting unit when the first bias unit receives a drive voltage from the electric power source. The second bias unit is for causing the second switch to conduct when amount of current flowing through the first switch exceeds a predetermined threshold, thereby turning off the first switch to interrupt current flow through the light emitting unit.

7 Claims, 3 Drawing Sheets

CURRENT-REGULATED LIGHT EMITTING DEVICE FOR VEHICLE USE

BACKGROUND OF THE INVENTION

1. Field of the Invention

The invention relates to a light emitting device, more particularly to a current-regulated light emitting device for vehicle use.

2. Description of the Related Art

Generally, a vehicle uses its battery to provide electric power for vehicle lights. Since battery voltage cannot be maintained at a constant level, battery power must undergo voltage stabilization and current rectification before it is supplied to the vehicle lights.

Referring to FIG. 1, a conventional voltage-stabilized light emitting device for vehicle use is shown to be adapted for electrical connection to an electric power source 61 of a vehicle, and includes a rectifier 62 adapted for electrical connection to the electric power source 61, a surge suppressor 63, a light emitting unit 64, and a voltage regulating unit 65 interconnecting the light emitting unit 64 and the rectifier 62. The light emitting unit 64 includes a plurality of light emitting components (D) and a plurality of current limiting resistors (R1). The light emitting components (D) are connected in series-pairs, and all of the series-pairs of the light emitting components (D) are then connected in parallel. The voltage regulating unit 65 includes a voltage stabilizing integrated circuit (IC), two resistors (R2), and a capacitor (C). The voltage regulating unit 65 serves to stabilize a drive voltage from the electric power source 61 before supplying the same to the light emitting unit 64.

When the electric power source 61 is unstable such that the drive voltage therefrom fluctuates, the voltage regulating unit 65 will operate to adjust the drive voltage to an appropriate value and to supply a stable current for the light emitting unit 64. In view of the need for continuous operation of the voltage regulating unit 65, the operating temperature thereof will increase, and prolonged operation at high temperatures affects operating stability and service life of the voltage regulating unit 65.

SUMMARY OF THE INVENTION

Therefore, the object of the present invention is to provide a highly stable current-regulated light emitting device for vehicle use with a switching design that permits components thereof to operate at a lower operating temperature.

Accordingly, a current-regulated light emitting device for vehicle use of the present invention comprises a light emitting unit and a current limiting unit.

The light emitting device includes at least one light emitting module that has a light emitting component. The current limiting unit includes a first switch, a first bias unit, a second switch and a second bias unit.

The first switch is adapted for making and breaking an electrical circuit between the light emitting unit and the electric power source. The first bias unit is connected electrically to the first switch, is adapted to be connected electrically to the electric power source, and causes the first switch to conduct such that the first switch makes the electrical circuit between the light emitting unit and the electric power source when the electric power source provides the drive voltage to the first bias unit, thereby resulting in current flow from the electric power source through the light emitting unit and the first switch to activate the light emitting unit. The second switch is connected electrically to the first switch. The second bias unit is connected electrically to the first and second switches, and causes the second switch to conduct when amount of current flowing through the first switch exceeds a predetermined threshold. Conduction of the second switch forces the first switch to turn off so as to break the electrical circuit between the light emitting unit and the electric power source, thereby interrupting the current flow through the light emitting unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
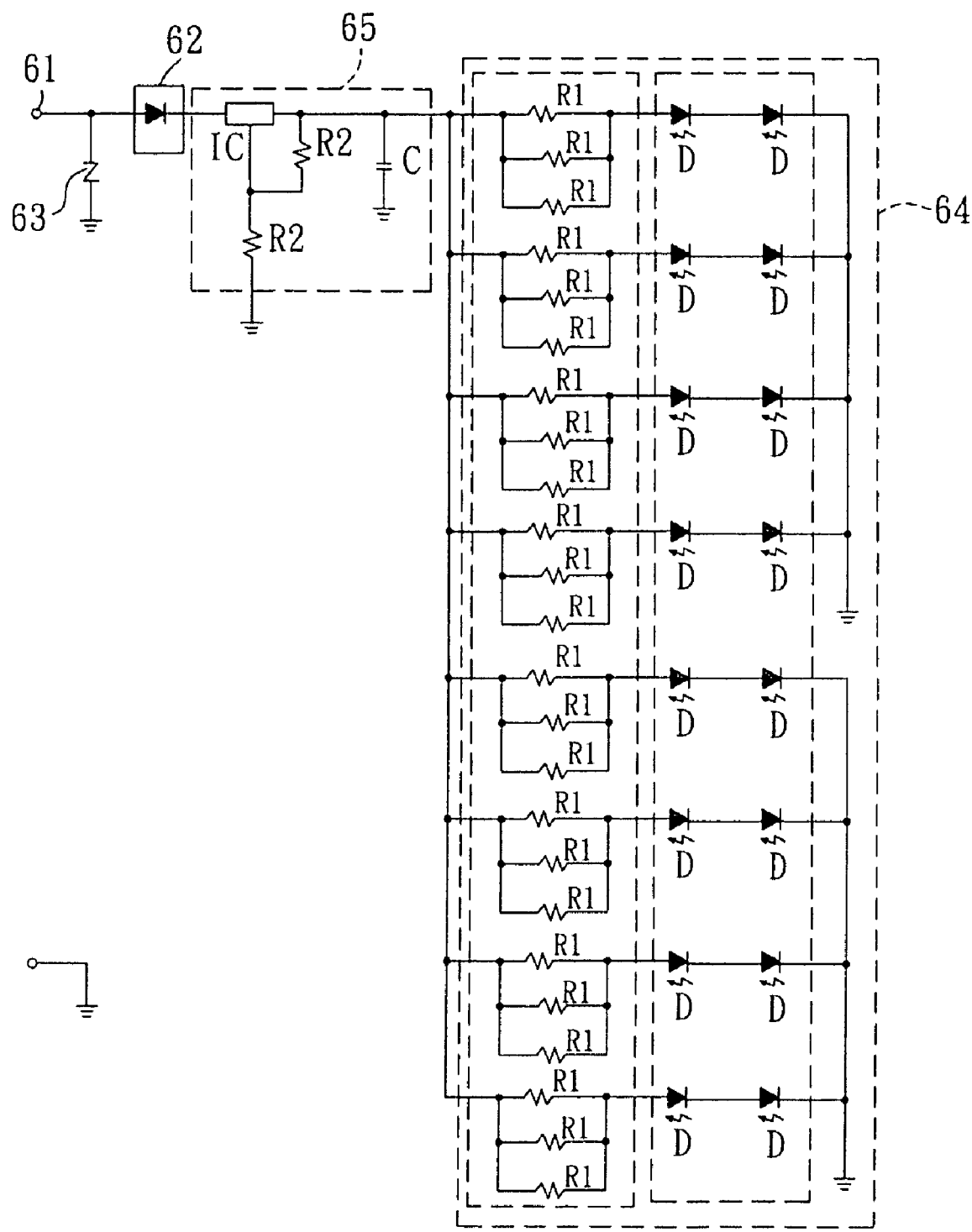
FIG. 1 is a schematic circuit diagram of a conventional voltage-stabilized light emitting device for vehicle use.
Figure 2:
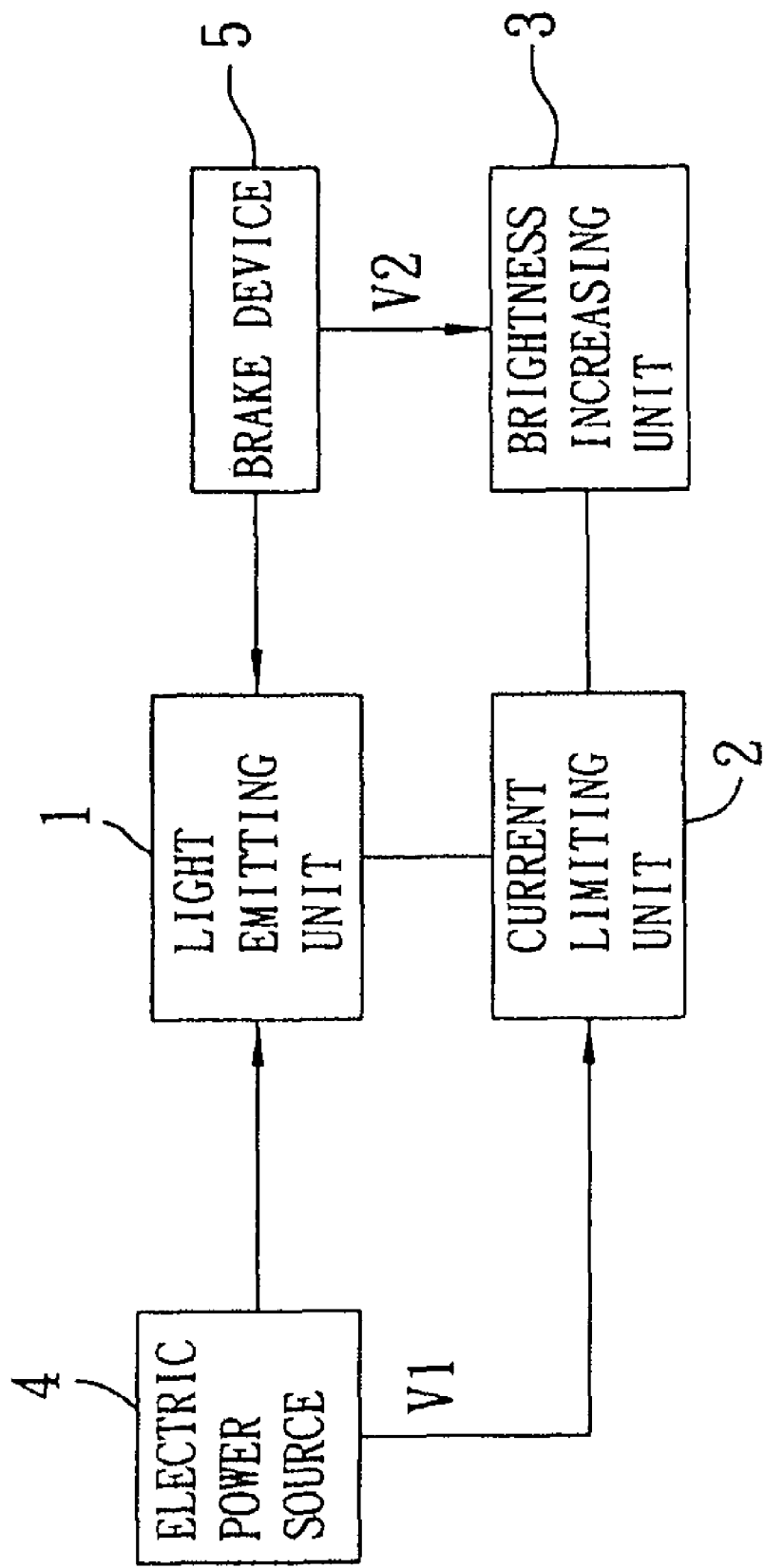
FIG. 2 is a functional block diagram of the preferred embodiment of a current-regulated light emitting device according to the present invention.
Figure 3:
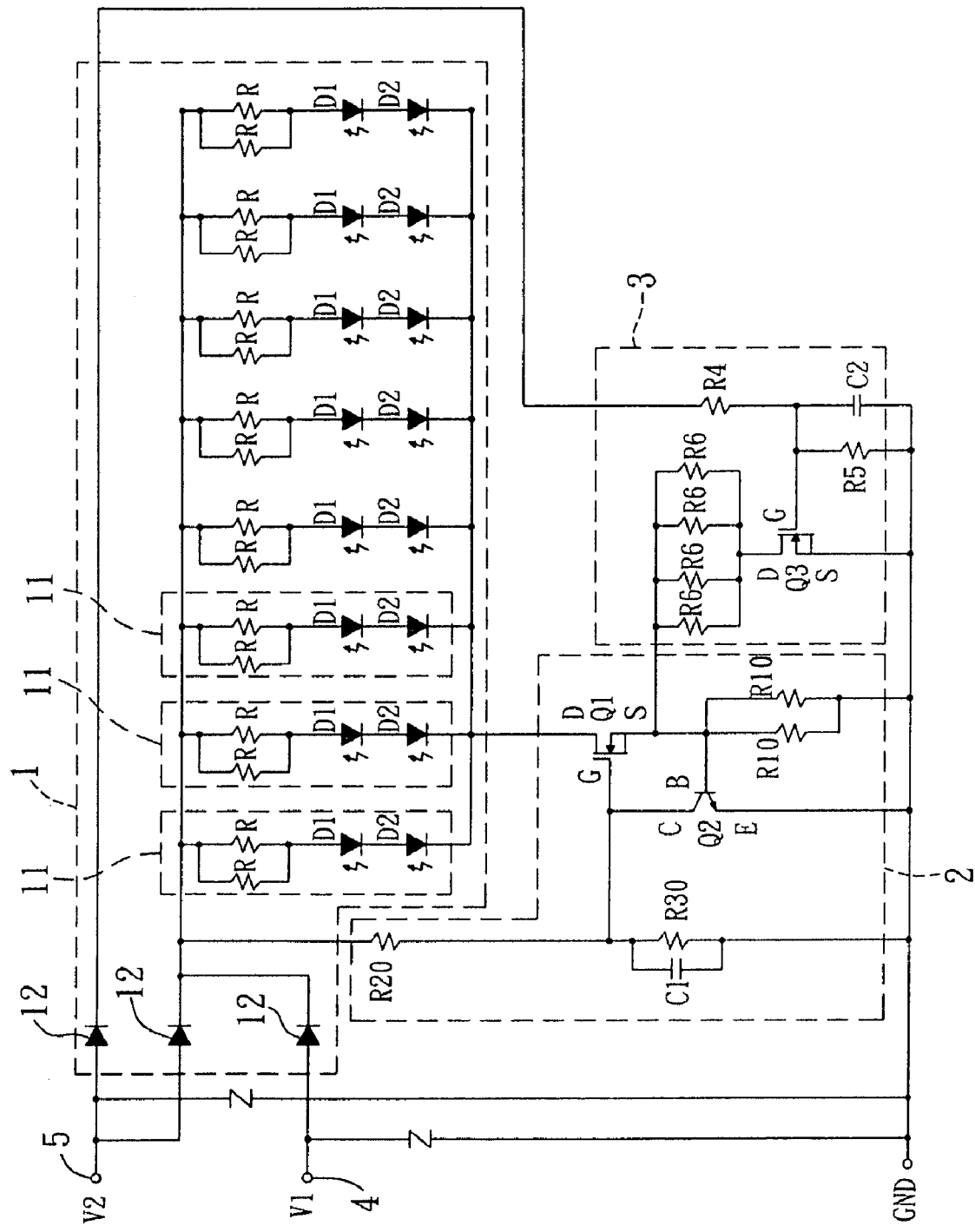
FIG. 3 is a schematic circuit diagram of the preferred embodiment.

Referring to FIGS. 2 and 3, the preferred embodiment of a current-regulated light emitting device for vehicle use according to the present invention is shown to be adapted for electrical connection to an electric power source 4 and a brake device 5 of a vehicle. The electric power source 4 is operable to output a drive voltage (V1), and the brake device 5 is operable to output a braking voltage (V2). The current-regulated light emitting device comprises a light emitting unit 1, a current limiting unit 2, and a brightness increasing unit 3.

The light emitting unit 1 is used as a vehicle light for illumination, is adapted for electrical connection to the electric power source 4 and the brake device 5, and includes a plurality of light emitting modules 11 connected in parallel, and three protective components 12. Each light emitting module 11 includes a first light emitting component (D1), a second light emitting component (D2), and a pair of current limiting resistors (R). It is noted that, in practice, the number of the light emitting components of each light emitting module 11 is not limited to two. The current limiting resistors (R) of each light emitting module 11 are connected in parallel, and the parallel-connected current limiting resistors (R) are connected in series between the respective first light emitting component (D1) and the protective components 12.

In this embodiment, each of the protective components 12 is an ordinary diode, e.g., 1N4007. One of the protective components 12 has an anode connected to the electric power source 4 and a cathode connected to the light emitting modules 11. Another of the protective components 12 has an anode connected to the brake device 5 and a cathode connected to the light emitting modules 11. The last of the protective components 12 has an anode connected to the brake device 5 and a cathode connected to the brightness increasing unit 3. The protective components 12 are used to protect the device of this invention from damage due to reverse polarity connection with the electric power source 4.

The current limiting unit 2 includes a first switch (Q1), a second switch (Q2), a pair of first resistors (R10) that serve as a second bias unit, second and third resistors (R20, R30) that form a voltage divider of a first bias unit, and a first capacitor (C1).

In this embodiment, the first switch (Q1) is a n-channel depletion-type metal-oxide-semiconductor field-effect transistor (MOSFET). In practice, other components that can serve the same function may be used. The first switch (Q1) has a first control end (G), a first input end (D), and a first output end (S). The first control end (G) is the gate and is connected electrically to the first bias unit. The first input end (D) is the drain and is connected electrically to the cathodes of the second light emitting components (D2) of the light emitting modules 11 of the light emitting unit 1. The first output end (S) is the source and is connected electrically to the first resistors (R10) of the second bias unit. The first switch (Q1) must be capable of bearing a voltage, which has a value larger than the drive voltage (V1), between the first input end (D) and the first output end (S).

In this embodiment, the second switch (Q2) is a npn-type bipolar junction transistor (BJT) that has a second control end (B) connected electrically to the first output end (D) and the first resistors (R10) of the second bias unit, a second input end (C) connected electrically to the first control end (G) and the first bias unit, and a second output end (E) that is grounded. The second control end (B) is the base of the bipolar junction transistor, the second input end (C) is the collector, and the second output end (E) is the emitter. In practice, a MOSFET may be used for the second switch (Q2) in other embodiments of this invention. However, since the conduction voltage required by the npn-type bipolar junction transistor is smaller than that of the MOSFET, which has a benefit of reducing power loss attributed to the first resistors (R10), the npn-type bipolar junction transistor is used for the second switch (Q2) in the preferred embodiment of this invention.

The first resistors (R10) of the second bias unit are connected in parallel, are connected electrically at one end to the first output end (S) and the second control end (B), and are further connected electrically at another end to the second output end (E), which is grounded. The second resistor (R20) of the voltage divider of the first bias unit is connected electrically at one end to the electric power source 4 via one of the protective components 12 and to the brake device 5 via another of the protective components 12. The second resistor (R20) is further connected electrically in series at another end to one end of the third resistor (R30). The first control end (G) and the second input end (C) are connected electrically to a junction of the second and third resistors (R20, R30). The third resistor (R30) is further connected electrically at another end to the second output end (E), which is grounded. The first capacitor (C1) is shunted to the third resistor (R30) for noise filtering.

The brightness increasing unit 3 is connected electrically to the brake device 5 and the current limiting unit 2, and includes fourth and fifth resistors (R4, R5) that form a voltage divider of a third bias unit, a second capacitor (C2), a plurality of coupling resistors (R6), and a third switch (Q3).

The fourth resistor (R4) is connected electrically at one end to the brake device 5 via one of the protective components 12, and is further connected electrically at the other end to the fifth resistor (R5) and the second capacitor (C2). The fifth resistor (R5) is connected in parallel to the second capacitor (C2), and the fifth resistor (R5) and the second capacitor (C2) are grounded at one end. The coupling resistors (R6) are connected in parallel, and the parallel-connected coupling resistors (R6) are connected electrically at one end to the first output end (S) and the second control end (B), and are further connected electrically at another end to the third switch (Q3). In this embodiment, the third switch (Q3) is a n-channel depletion-type MOSFET, and has a third control end (G) connected electrically to a junction of the fourth and fifth resistors (R4, R5), a third input end (D) connected electrically to the coupling resistors (R6), and a third output end (S) connected electrically to the second output end (E), which is grounded. The third control end (G) is the gate, the third input end (D) is the drain, and the third output end (S) is the source of the MOSFET.

In operation, when the electric power source 4 provides the drive voltage (V1) to the voltage divider of the first bias unit, a voltage sufficient to cause the first switch (Q1) to conduct will be present at the first control end (G), such that the first switch (Q1) makes an electrical circuit between the light emitting unit 1 and the electric power source 4 to result in current flow from the electric power source 4 through the current limiting resistors (R), the first and second light emitting components (D1, D2), the first switch (Q1), and the first resistors (R10) of the second bias unit, thereby activating the first and second light emitting components (D1, D2) of the light emitting modules 11 of the light emitting unit 1 to emit light.

When the drive voltage (V1) fluctuates such that the amount of current flowing through the first switch (Q1) exceeds a predetermined threshold, the voltage across the first resistors (R10) reaches 0.7 volt, which is sufficient to cause the second switch (Q2) conduct. Conduction of the second switch (Q2) forces the first switch (Q1) to turn off so as to break the electrical circuit between the light emitting unit 1 and the electric power source 4, thereby interrupting the current flow through the light emitting unit 1 so as to deactivate the first and second light emitting components (D1, D2) of the light emitting modules 11 of the light emitting unit 1.

When the current flow through the light emitting unit 1 is interrupted, the voltage at the second control end (B) will become lower than the conduction voltage required by the second switch (Q2), thereby turning off the second switch (Q2) so that the voltage at the first control end (G) is once again sufficient to cause the first switch (Q1) to conduct. When the first switch (Q1) conducts, the electrical circuit between the light emitting unit 1 and the electric power source 4 is made so that the first and second light emitting components (D1, D2) of the light emitting modules 11 of the light emitting unit 1 are activated to emit light once more. Therefore, due to alternating switching of the first and second switches (Q1, Q2), the amount of current flowing through the light emitting modules 11 of the light emitting unit 1 can be regulated.

In this embodiment, when the brake of the vehicle is operated, the brake device 5 outputs the braking voltage (V2) that is received by the third bias unit. The braking voltage (V2) is divided by the fourth and fifth resistors (R4, R5) of the voltage divider of the third bias unit such that the voltage at the third control end (G) is sufficient to cause the third switch (Q3) to conduct. When the third switch (Q3) conducts, the coupling resistors (R6) are connected in parallel to the first resistors (R10) to result in a lower equivalent resistance. As a result, a larger amount of electric current is required to flow through the first output end (S) before the second switch (Q2) conducts. In other words, by connecting the coupling resistors (R6) in parallel to the first resistors (R10), the predetermined threshold is reconfigured so as to allow a larger amount of current to flow through the light emitting unit 1 and the first switch (Q1) before the second switch (Q2) conducts. The larger amount of current flowing through the first and second light emitting components (D1, D2) results in increased brightness in the light emitted thereby. Therefore, when the brake is operated, the brightness increasing unit 3 enables the first and second light emitting components (D1, D2) to emit brighter light for good braking warning indication.

In sum, when electric current not exceeding the predetermined threshold flows through the first and second light emitting components (D1, D2) of the light emitting modules 11 of the light emitting unit 1, the first switch (Q1) conducts while the second switch (Q2) is turned off. On the other hand, when electric current exceeding the predetermined threshold flows through the first and second light emitting components (D1, D2), the second switch (Q2) conducts so as to turn off the first switch (Q1), thereby interrupting current flow through the light emitting unit 1. Through alternating switching of the first and second switches (Q1, Q2), the electric current flowing through the light emitting unit 1 can be regulated even when the drive voltage (V1) of the electric power source 4 is unstable and fluctuates wildly. The switching design employed in the present invention can prevent components thereof from operating continuously to prevent overheating. That is, the components of the present invention are permitted to operate at a lower operating temperature to result in advantages of higher stability and a longer service life.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A current-regulated light emitting device for vehicle use, said current-regulated light emitting device being adapted to receive a drive voltage from an electric power source and comprising:
    a light emitting unit including at least one light emitting module that has a light emitting component; and
    a current limiting unit including
        a first switch adapted for making and breaking an electrical circuit between said light emitting unit and the electric power source,
        a first bias unit connected electrically to said first switch, adapted to be connected electrically to the electric power source, and causing said first switch to conduct such that said first switch makes the electrical circuit between said light emitting unit and the electric power source when the electric power source provides the drive voltage to said first bias unit, thereby resulting in current flow from the electric power source through said light emitting unit and said first switch to activate said light emitting unit,
        a second switch connected electrically to said first switch, and
        a second bias unit connected electrically to said first and second switches, and causing said second switch to conduct when amount of current flowing through said first switch exceeds a predetermined threshold, wherein conduction of said second switch forces said first switch to turn off so as to break the electrical circuit between said light emitting unit and the electric power source, thereby interrupting the current flow through said light emitting unit.

2. The current-regulated light emitting device as claimed in claim 1, wherein:
    said first switch has a first control end connected electrically to said first bias unit, a first input end connected electrically to said light emitting unit, and a first output end connected electrically to said second bias unit; and
    said second switch has a second control end connected electrically to said first output end and said second bias unit, a second input end connected electrically to said first control end and said first bias unit, and a second output end connected electrically to said second bias unit.

3. The current-regulated light emitting device as claimed in claim 2, wherein said first switch is a metal-oxide-semiconductor field-effect transistor with a gate serving as said first control end, a drain serving as said first input end, and a source serving as said first output end.

4. The current-regulated light emitting device as claimed in claim 2, wherein said second switch is a bipolar junction transistor with a base serving as said second control end, a collector serving as said second input end, and an emitter serving as said second output end.

5. The current-regulated light emitting device as claimed in claim 2, wherein:
    said second bias unit includes a first resistor connected electrically at one end to said first output end and said second control end and further connected electrically at another end to said second output end, and
    said first bias unit includes a voltage divider connected electrically to said second output end and adapted to be connected electrically to the electric power source, said voltage divider including series-connected second and third resistors, said first control end and said second input end being connected electrically to a junction of said second and third resistors.

6. The current-regulated light emitting device as claimed in claim 5, further comprising a brightness increasing unit that includes a coupling resistor connected electrically to said current limiting unit, a third switch connected electrically to said coupling resistor, and a third bias unit connected electrically to said third switch and adapted to receive a braking voltage,
    said coupling resistor being connected electrically at one end to said first output end and said second control end, and being further connected electrically at another end to said third switch,
    said third switch having a third control end connected electrically to said third bias unit, a third input end connected electrically to said coupling resistor, and a third output end connected electrically to said second output end,
    said third bias unit causing said third switch to conduct when the braking voltage is provided to said third bias unit such that said third switch connects said coupling resistor in parallel to said first resistor, thereby reconfiguring the predetermined threshold so as to allow a larger amount of current to flow through said light emitting unit and said first switch before said second switch conducts.

7. The current-regulated light emitting device as claimed in claim 1, wherein said light emitting module further has a current limiting resistor adapted for connecting electrically said light emitting component to the electric power source.

* * * * *